United States Patent
Trendelkamp et al.

(10) Patent No.: US 6,533,934 B1
(45) Date of Patent: Mar. 18, 2003

(54) FILTER-REPLACEMENT CASSETTE

(76) Inventors: Josef Trendelkamp, Emsdettener Str. 131, D-4418 Nordwalde (DE); Jürgen Veltel, Kolpingstr. 9, D-4409 Havixbeck (DE)

( * ) Notice: Subject to any disclaimer, the term of this patent is extended or adjusted under 35 U.S.C. 154(b) by 0 days.

(21) Appl. No.: 08/324,369

(22) Filed: Oct. 17, 1994

Related U.S. Application Data

(63) Continuation of application No. 07/949,634, filed on Jun. 1, 1993, now abandoned.

(30) Foreign Application Priority Data

Apr. 23, 1991 (DE) .......................... 91 05 000 U
Apr. 13, 1992 (WO) .................... PCT/92/00832

(51) Int. Cl.$^7$ ............................................. B01D 35/12
(52) U.S. Cl. ........................ 210/236; 210/329; 210/341; 210/447; 425/185; 425/199
(58) Field of Search ................. 425/185, 186, 425/197, 198, 199; 264/169; 210/236, 447, 329, 341

(56) References Cited

U.S. PATENT DOCUMENTS

| 4,167,384 A | * | 9/1979 | Shirato et al. | 425/199 |
|---|---|---|---|---|
| 4,416,605 A | * | 11/1983 | Konno et al. | 425/199 |
| 4,507,072 A | * | 3/1985 | Gaul, Jr. | 425/199 |
| 4,597,870 A | * | 7/1986 | Lambertus | 425/199 |
| 4,752,386 A | * | 6/1988 | Schulz et al. | 425/199 |
| 4,814,186 A | * | 3/1989 | Trott | 425/199 |
| 5,004,414 A | * | 4/1991 | Stude et al. | 425/199 |
| 5,032,267 A | * | 7/1991 | Petschner | 425/199 |
| 5,125,823 A | * | 6/1992 | Kreyenborg | 425/199 |

FOREIGN PATENT DOCUMENTS

| DE | 9011605 | * | 10/1990 |
|---|---|---|---|
| EP | 0399086 | * | 11/1990 |

* cited by examiner

Primary Examiner—Jan H. Silbaugh
Assistant Examiner—Joseph Leyson
(74) Attorney, Agent, or Firm—Milde & Hoffberg, LLP

(57) ABSTRACT

A filter-replacement cassette for an extruder. A housing (1) has at least one bore. The bores (2 & 3) extend above and below and at a right angle to the horizontally flowing plastic. A cartridge (4 or 5) that accommodates a replaceable filter (5) slides back and forth inside each bore. The object is to facilitate start-up operation. The cartridge accordingly has at least one tap (7, bore 15, or bore 45) permanently integrated into it in addition to the replaceable filter. The housing accommodates either a cartridge or a start-up outlet bore (16, 36, or 47). While the cartridge is in a prescribed position, the start-up outlet bore can communicate with the cartridge's tap and with an intake channel (13 or 31) for the extrudate.

4 Claims, 8 Drawing Sheets

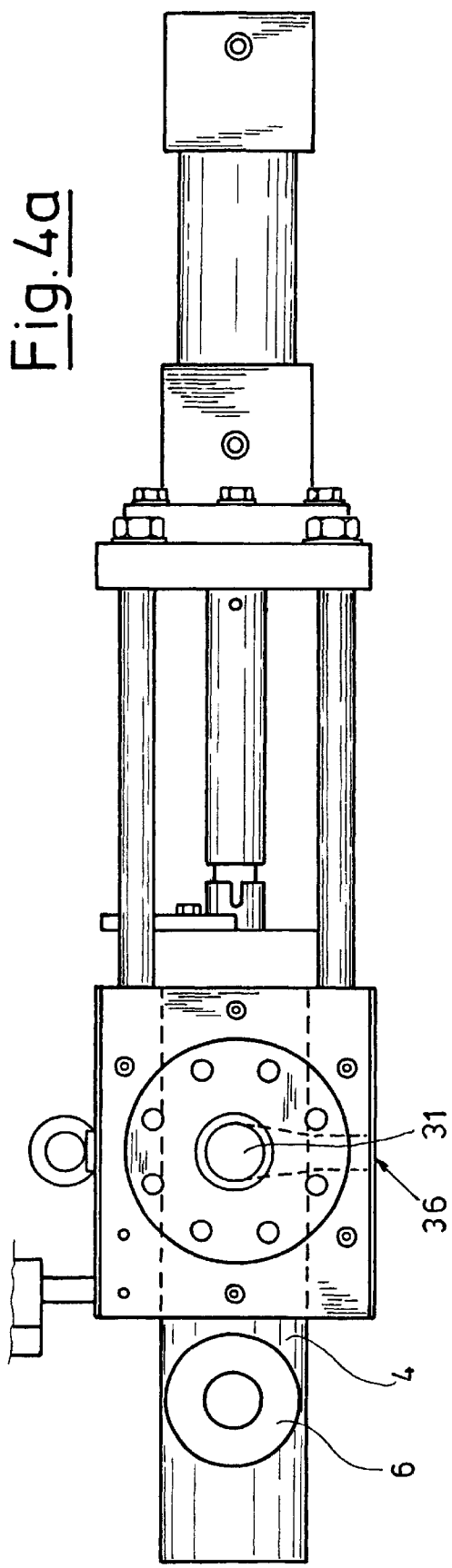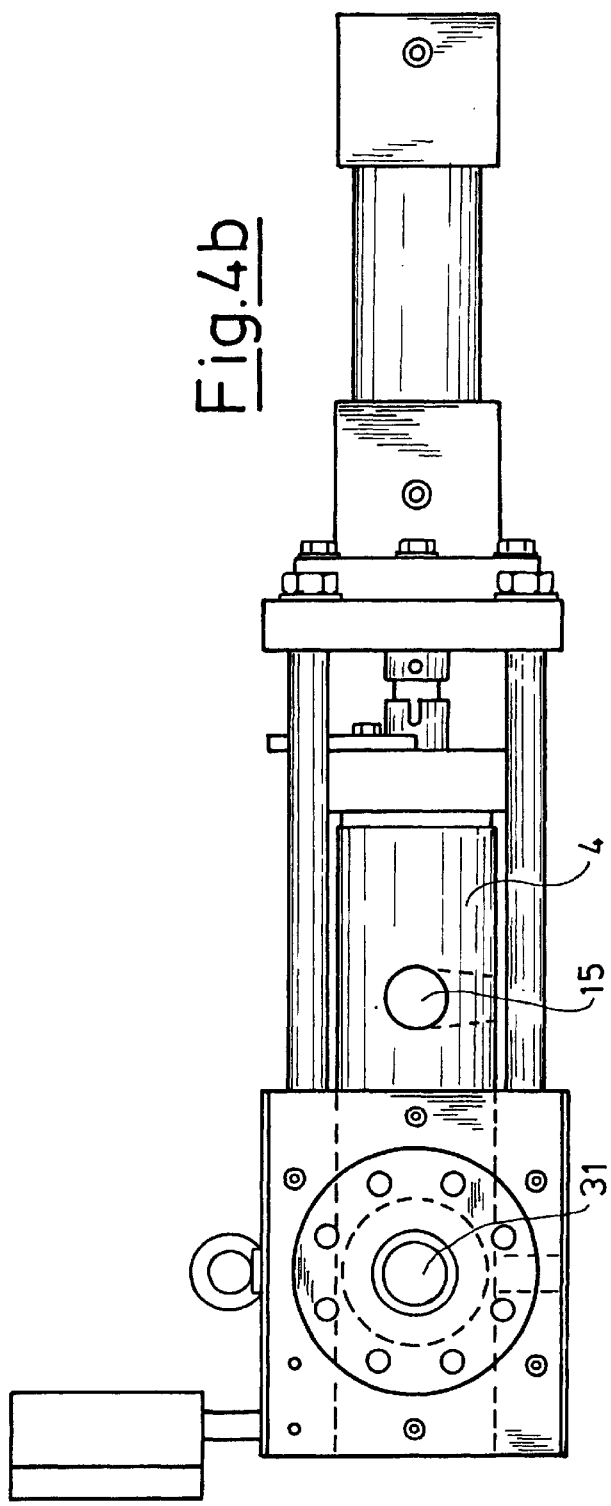

FILTER-REPLACEMENT CASSETTE

This application is a continuation, of application Ser. No. 07/949,634, filed Jun. 1, 1993, now abandoned.

BACKGROUND OF THE INVENTION

The present invention concerns a filter-replacement cassette for an extruder. The cassette has a housing. The housing has at least one bore. The bores extend above and below and at a right angle to the horizontally flowing plastic. A cartridge that accommodates a replaceable filter slides back and forth inside each bore.

Filter-replacement cassettes are positioned downstream of the outlet from an extruder, and the thermoplastic melted in the extruder initially travels through a simple or composite filter that filters out contamination. The filter or filters, and the perforated disk they rest against, are accommodated in a replaceable cartridge. One cassette which contains only a single filter cartridge is sometimes employed, so that the extrusion process has to be interrupted to change the filter. Filter-replacement cassettes with one cartridge above another are also known, with the extrudate traveling through both. One of the two cartridges is always blocked off during the replacement process, and the extrusion process is not interrupted.

There is a drawback, however, in that, when a new section is to be extruded or especially when a different plastic is to be employed, a considerable quantity of defective plastic section will initially be extruded that should not be allowed into the gauging tool downstream of the extrusion head. Start-up valves and outlets are accordingly employed in the vicinity of the extrusion head, and the waste is diverted through them.

Another drawback to the known approach to replacing filters is that the filter-replacement cassette must be separate from the diversion mechanisms, which makes the cassettes relatively expensive.

SUMMARY OF THE INVENTION

The principal object of the present invention is to employ existing filter-replacement cassettes to simplify the start-up procedure in an extruder.

This object is attained in a filter-replacement cassette of the aforesaid type wherein the cartridge has at least one tap permanently integrated into it in addition to the replaceable filter, the housing accommodates either a cartridge or a start-up outlet bore and, when it accommodates the cartridge and while the cartridge is in a prescribed position, the start-up outlet bore can communicate with the cartridge's tap and with an intake channel for the extrudate.

The concept behind the present invention is to provide the cartridge, which can be longer than a conventional cartridge if necessary, with a means of diversion, specifically the tap, to thereby allow it to assume, in addition to the traditional operating and filter-replacement positions, another and specifically defined position wherein the tap intercepts the waste extruded during start-up.

The present invention allows both discontinuous operation (with a single cartridge) and continuous operation (with two cartridges). In the latter event, it preferably is the lower cartridge that has the tap.

The present invention also features an embodiment with a single start-up outlet bore. The tap in this embodiment provides communication between an outlet bore at the end of the cartridge and the intake line.

BRIEF DESCRIPTION OF THE DRAWINGS

The preferred embodiments of the invention will now be specified with reference to the accompanying drawings.

FIGS. 4a and 4b are schematic illustrations of a filter-replacement cassette with only one cartridge, FIG. 4a in the starting position and FIG. 4b in the filtering position.

DESCRIPTION OF THE PREFERRED EMBODIMENTS

Figure 1:
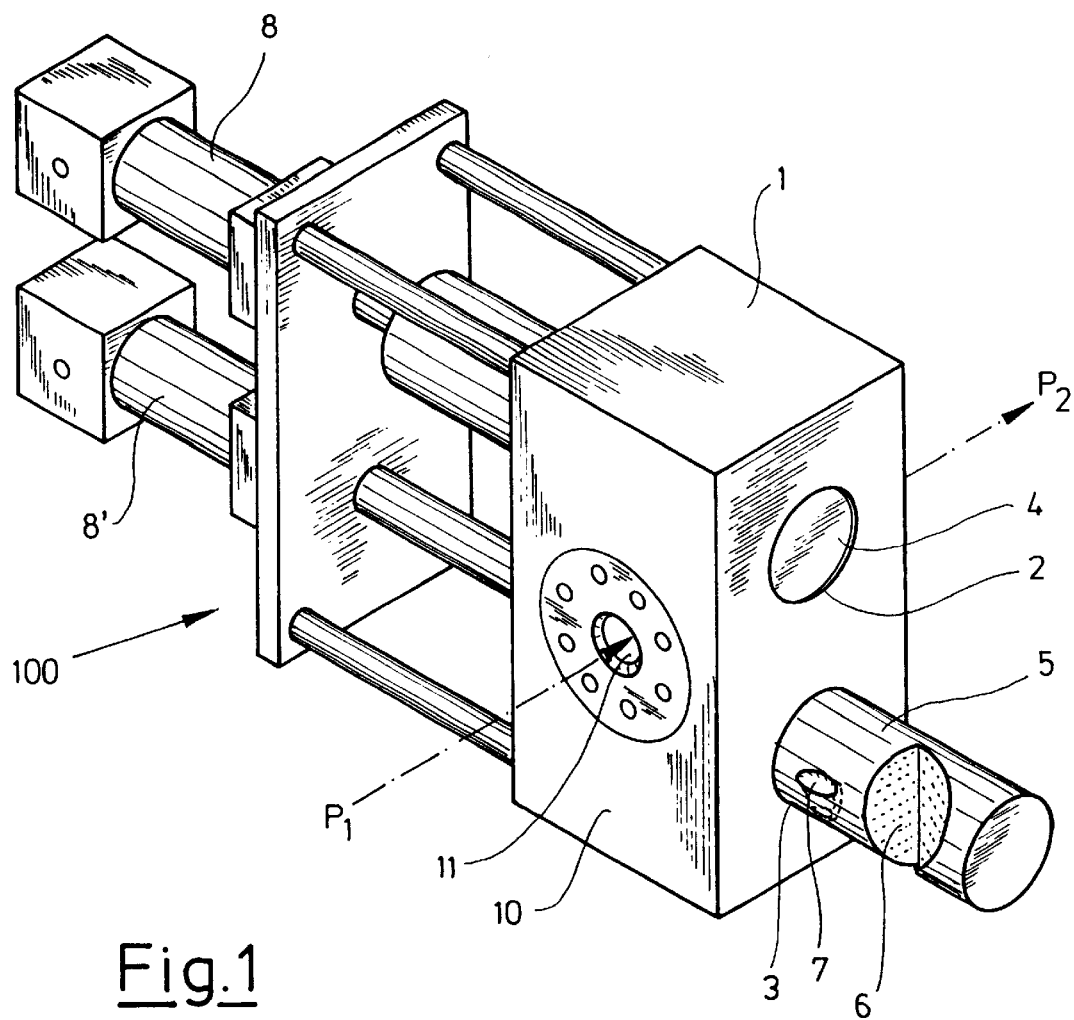
FIG. 1 is a perspective view of a filter-replacement cassette.

FIG. 1 illustrates a filter-replacement cassette for an extruder. The cassette has a housing 1. One face 10 of the housing can be secured to a flange on the extruder. Arrow P1 represents the molten thermoplastic entering the cassette and arrow P2 the extrudate leaving it. The route of the plastic inside the housing will be specified hereinafter. Housing 1 accommodates bores 2 and 3 above and below and at a right angle to the horizontally flowing plastic. A filter cartridge 4 or 5 slides back and forth in each bore 2 and 3, respectively, and accommodates a replaceable filter 6. The lower cartridge 5 in this particular embodiment is longer than upper cartridge 4. Lower cartridge 5 accommodates between its free end and filter 6 a permanently integrated tap 7 with a bore extending through it.

How the invention works will now be described with reference to FIGS. 2a through 2d and FIGS. 3a through 3c.

Figure 2A:
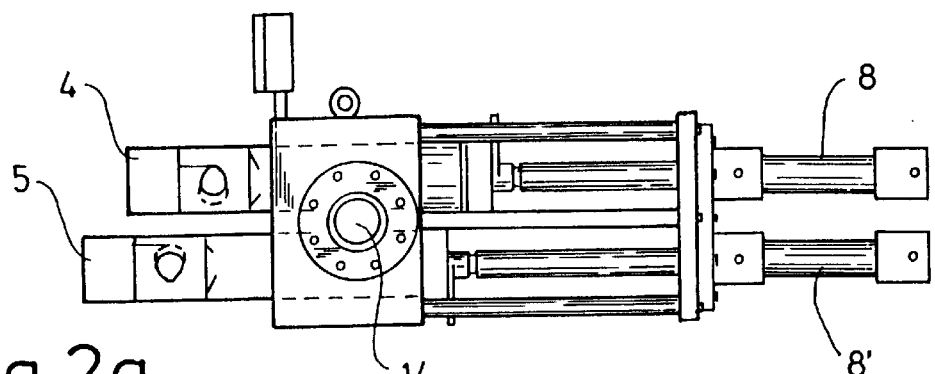
FIGS. 2a through 2d are schematic illustrations of the cassette in FIG. 1, FIG. 2a representing it in the start-up position, FIG. 2b in the transition position, FIG. 2c in the filtering position, and FIG. 2d in the filter-replacement position.
Figure 2B:
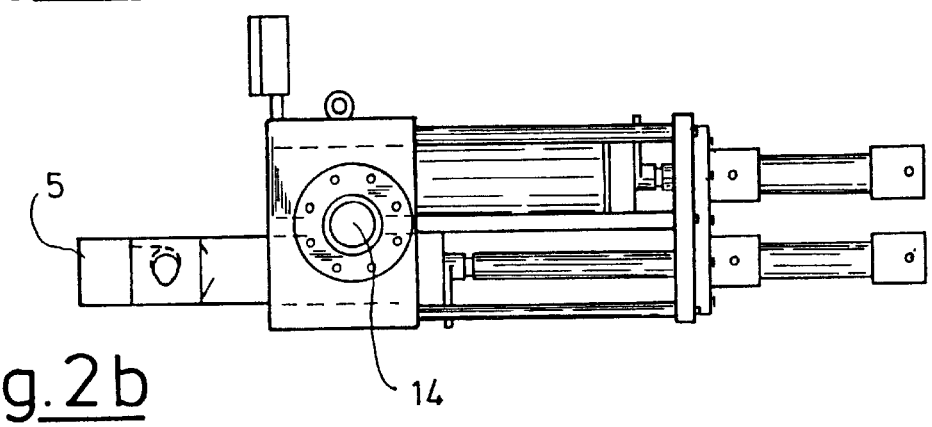
Figure 2C:
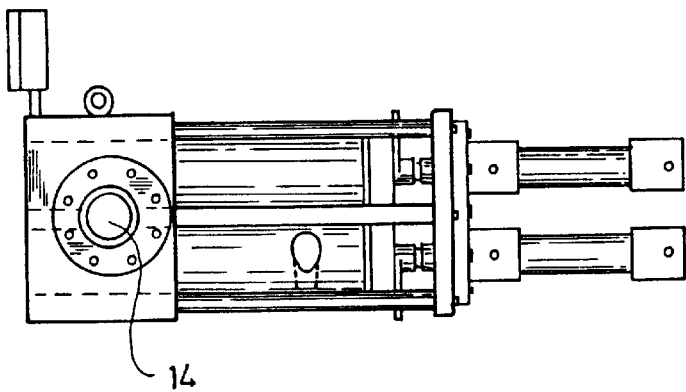
Figure 2D:
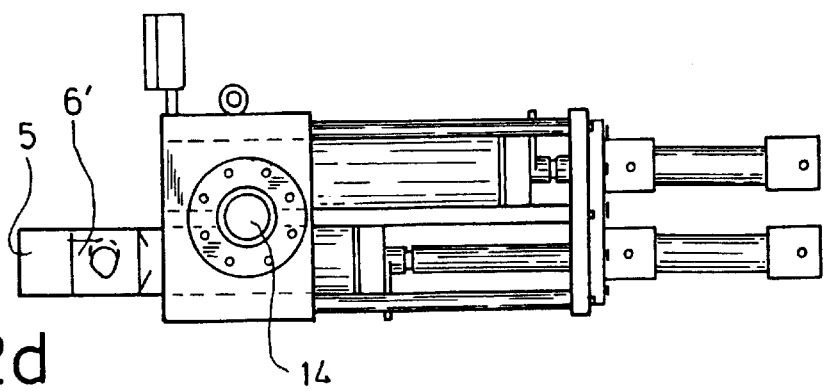
Figure 3A:
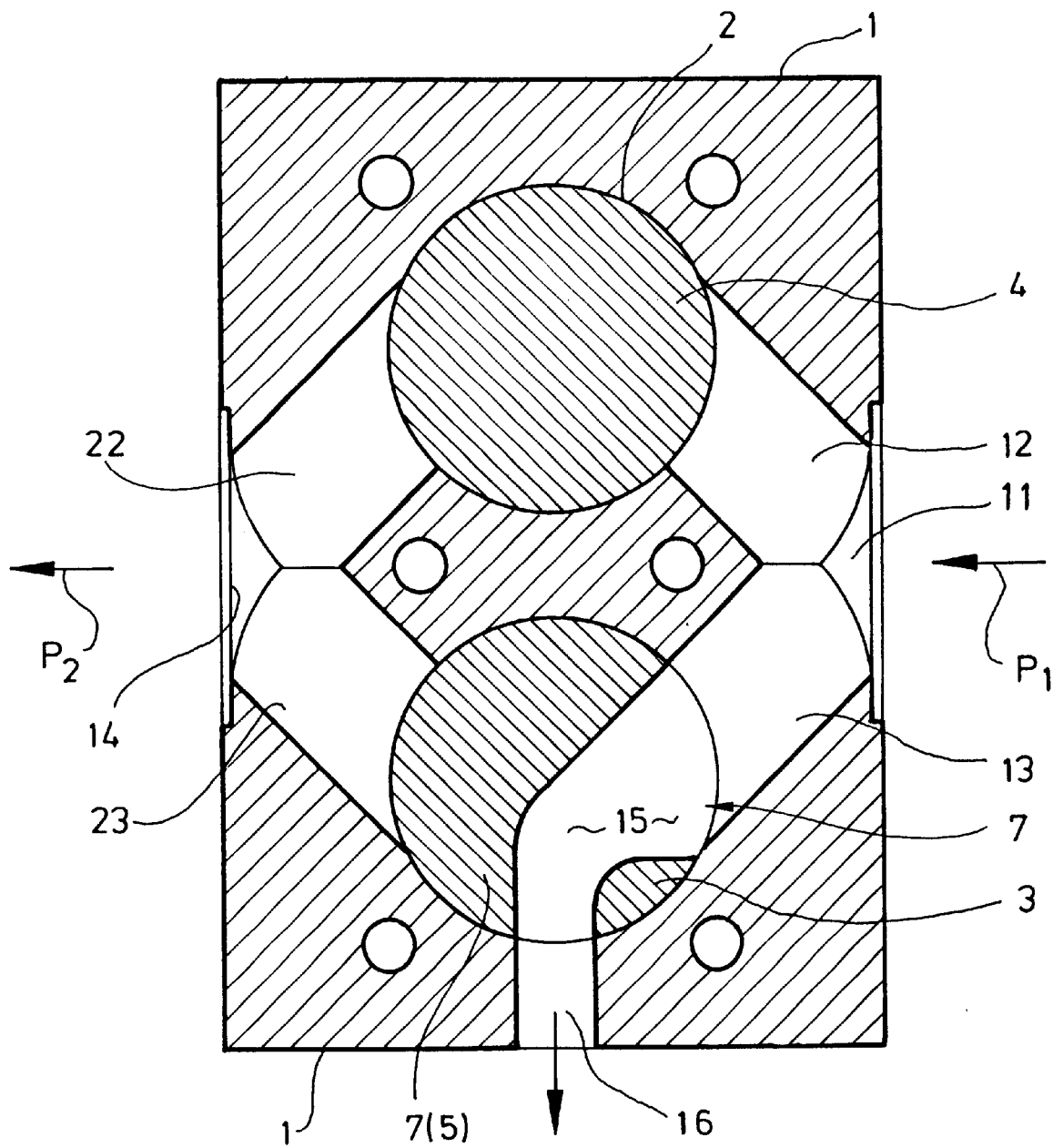
FIGS. 3a through 3c are cross-sectional views through the cassette illustrated in FIGS. 2a–2d, with the cartridge in different positions, FIG. 3a representing it in the start-up position, FIG. 3b in the transition position, and FIG. 3c in the filtering position.
Figure 3B:
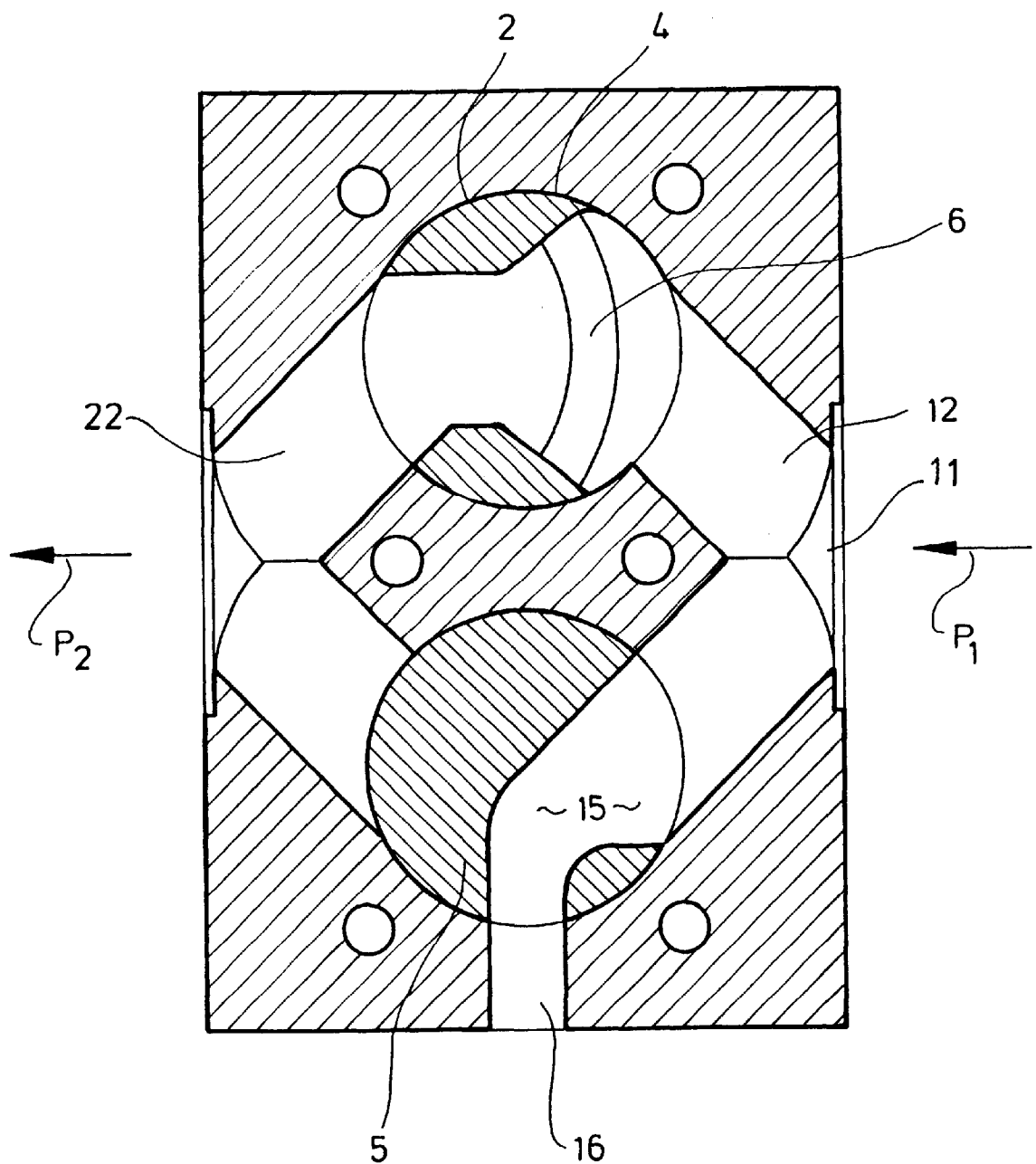
Figure 3C:
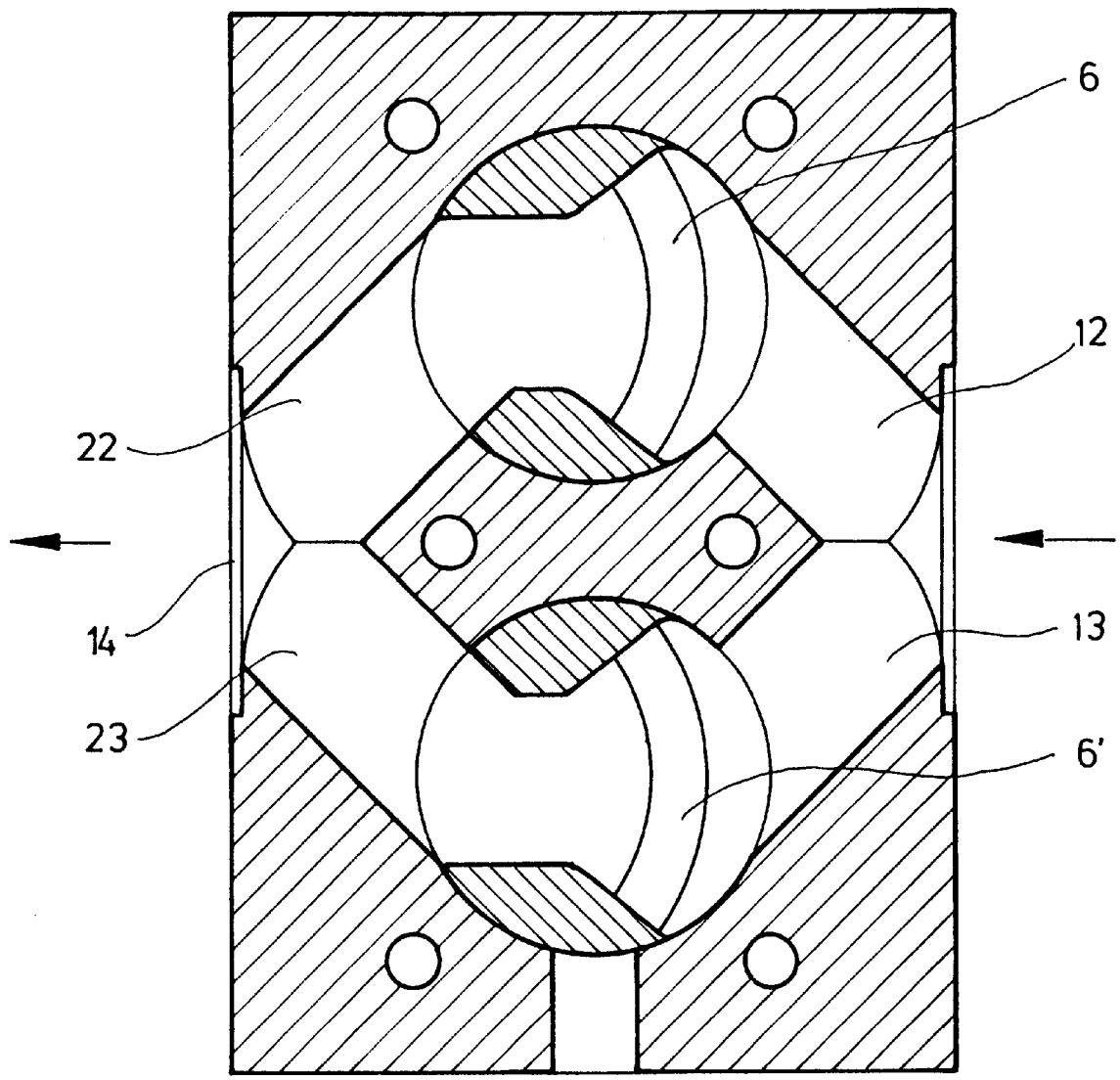

FIGS. 2a through 2d illustrate the cassette illustrated in FIG. 1 but from the outlet end and FIGS. 3a through 3c in lateral section.

Cartridges 4 and 5 can be introduced into and extracted from the housing by hydraulic cylinders 8 and 8'. In the start-up position illustrated in FIGS. 2a and 3a, upper cartridge 4 blocks off the plastic's upper channel. This channel comprises an intake opening 11 and two branches 12 and 13, specifically an upper branch 12 leading to upper bore 2 and a lower branch 13 leading to lower bore 3. Bores 2 and 3 also communicate with branches 22 and 23 that open into an outlet opening 14.

As will be evident from the figures, upper cartridge 4 prevents communication between branches 12 and 22. Lower cartridge 5 on the other hand has advanced until its tap 7 precisely connects lower branch 13 with a start-up outlet bore 16. There is a bore 15 in tap 7 for this purpose.

As illustrated in FIG. 3a, however, the extrudate arriving at intake opening 11 can leave directly through start-up outlet bore 16.

In the transition position illustrated in FIGS. 2b and 3b, upper cartridge 4 has advanced until a perforated disk and hence filter 6 is far enough inside upper bore 2 to provide communication between branches 12 and 22, whereas the molten plastic must still flow through the filter when it is not intended to emerge through start-up outlet bore 16. In the actual operating-and-filtering position illustrated in FIGS. 2c and 3c, both cartridges are farthest out. The result is the interposition of a filter disk 6' in the channel constituted by branches 13 and 23. The plastic now flows both through filters 6 and 6' on its way to outlet opening 14.

When a filter has to be replaced, the known replacement position illustrated in FIG. 2d is established. The filter, lower cartridge 5 by way of example in the present case, is forced out, and the other filter, filter 6 in the present case, assumes the function of transmitting and filtering the molten plastic. The filter 6' in lower cartridge 5 can now be replaced.

FIGS. 4a and 4b and FIGS. 5a and 5b represent a similar but discontinuous procedure. Only one cartridge 4 is involved. There is a single filter 6 to the left in FIG. 4a, and the tap, which is in this embodiment a bore 15 through the solid mass of cartridge 4, is in the right half of the cartridge.

Figure 5A:
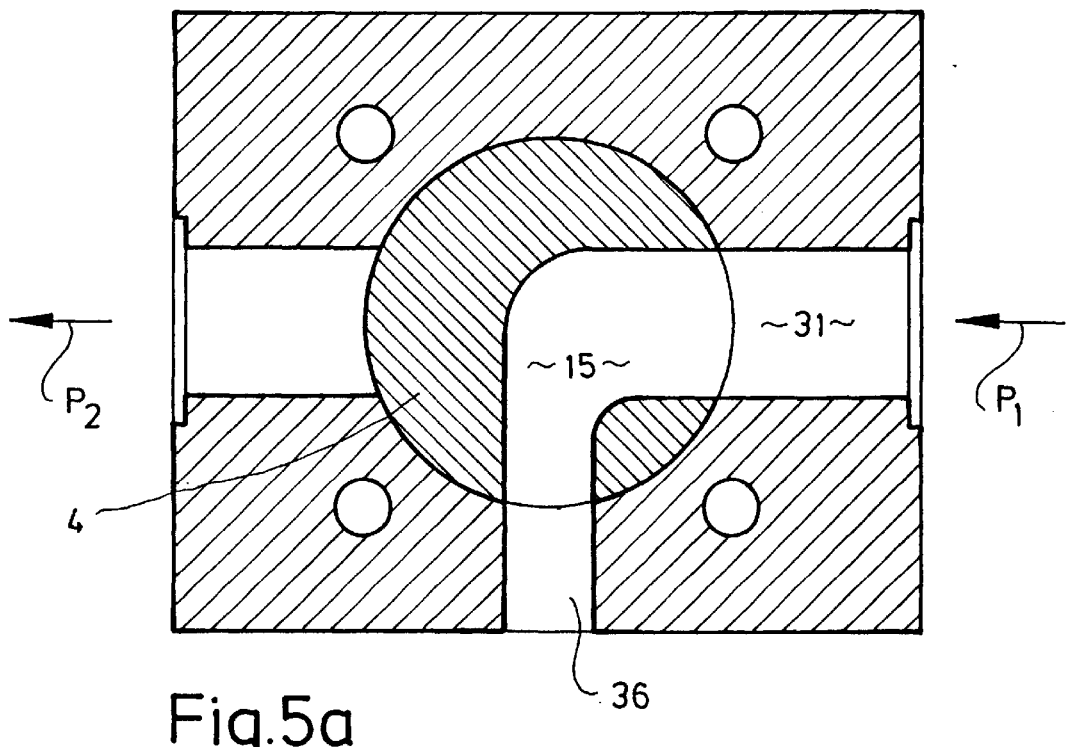
FIGS. 5a and 5b are cross-sectional views through the cassette illustrated in FIGS. 4a and 4b, FIG. 5a representing the start-up position and FIG. 5b the filtering position.
Figure 5B:
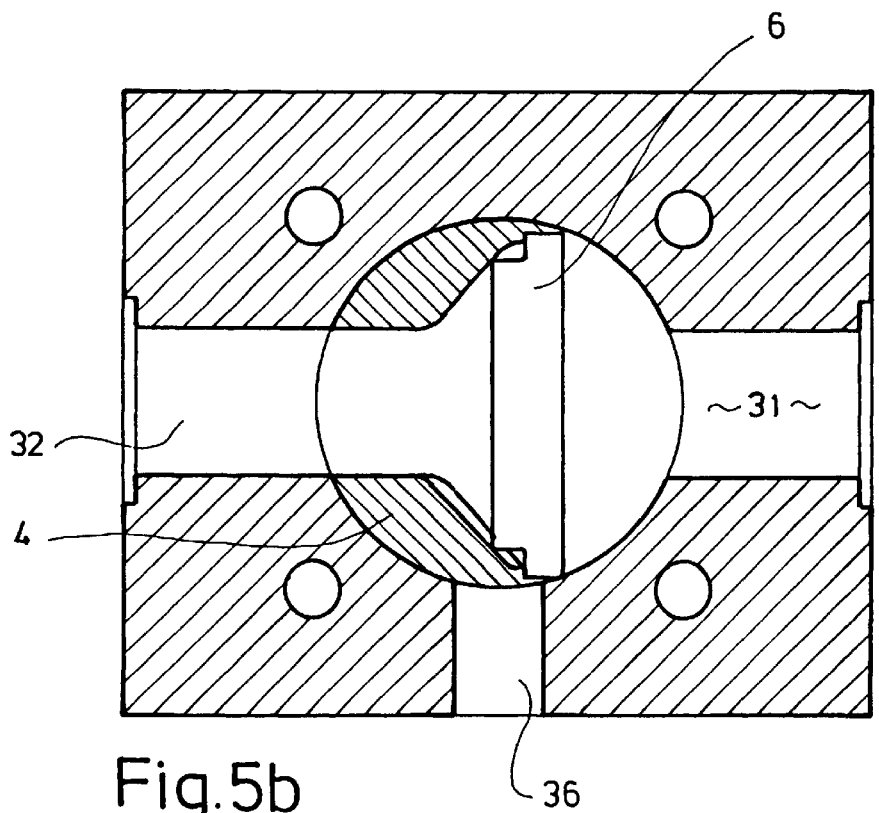

In the start-up position illustrated in FIGS. 4a and 5a, cartridge 4 and bore 15 provide communication between an intake channel 31 and a start-up outlet bore 36. In the filtering position illustrated in FIGS. 4b and 5b, cartridge 4 is advanced far enough for filter 6 to provide communication between intake channel 31 and an outlet channel 32, with the molten plastic conventionally traveling through filter 6.

Replacing a filter requires turning off the extruder and occurs with the filter disk out and with cartridge 4 accordingly farther to the left, with the solid region of cartridge 4 preventing communication between channels 31 and 32 or 31 and 36 (unillustrated).

Figure 6:
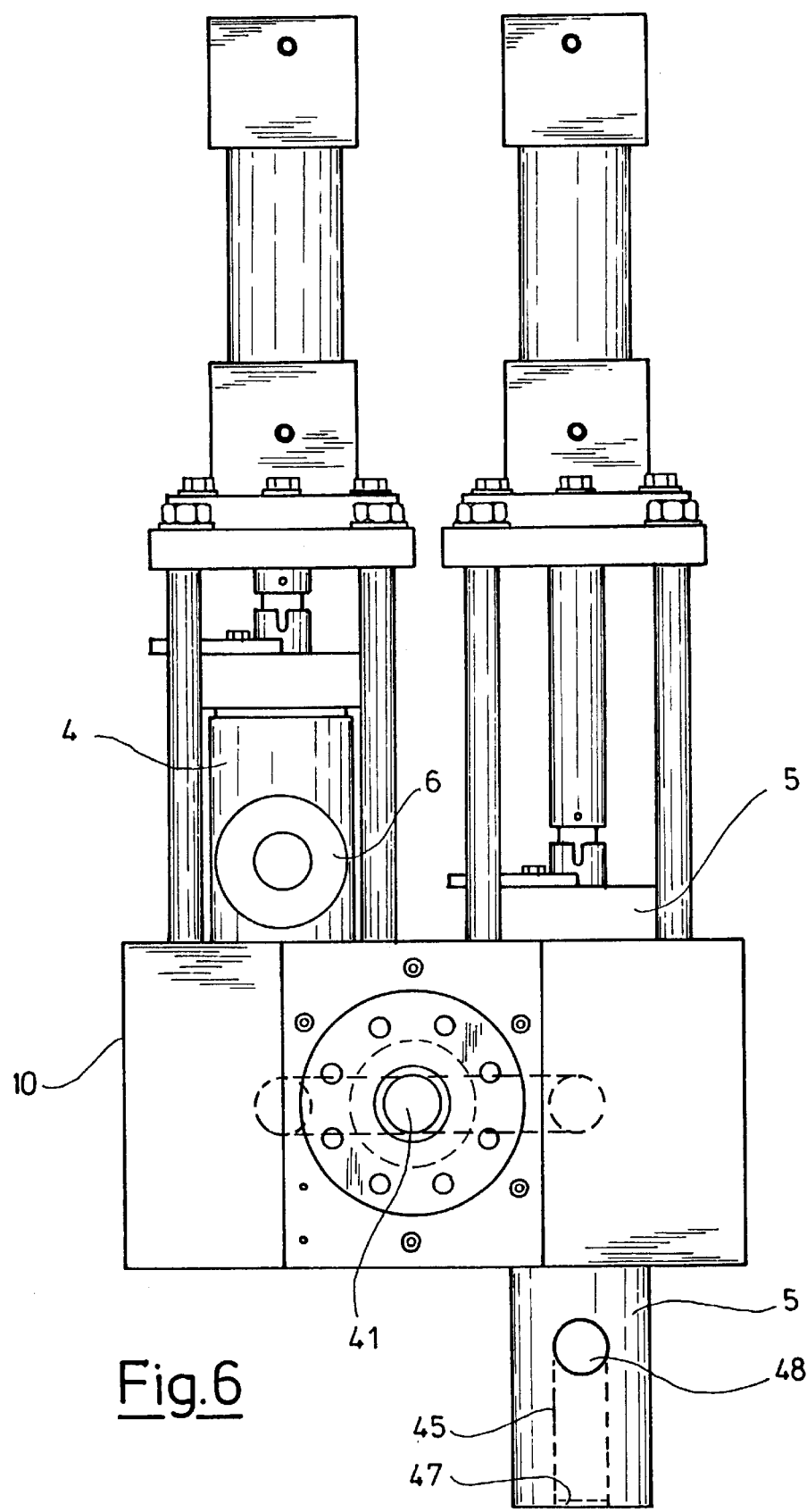
FIG. 6 illustrates a filter-replacement cassette with another bore in the cartridge.

FIG. 6 represents still another alternative. A filter cartridge 4 is accommodated upright in housing 10 and accommodates in turn a replaceable filter 6 in its upper half. Another upright cartridge 5 is accommodated next to cartridge 4. The molten plastic travels a route similar to that described with reference to FIGS. 3a–3c. A bore 45 extends through cartridge 5, which has two openings 48 and 47. Openings 48 and 47 provide communication through the bore 45 between an intake 41 on the front of housing 10 and the intake 48 into the bore 45, which is at the bottom in cartridge 5 as represented by the dashed lines. The bore 45 has an exit for the waste extrudate in the form of an outlet 47. The waste can accordingly flow directly down.

The term "tap" refers herein not only to a separate component attached to the cartridge but also to a bore through the integral mass of the cartridge that functions like a tap in the sense of the invention.

There has thus been shown and described a novel filter-replacement cassette which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A filter-replacement device for an extruder, comprising (a) a housing having an inlet and an outlet for flowing plastic extrudate, first and second flow passages for the extrudate extending between said inlet and outlet, a start-up outlet bore communicating with said first flow passage, and first and second linear bores that extend through the first and second passages, respectively, at a right angle to the direction of flow of extrudate in said passages, and (b) first and second cartridges, respectively accommodating replaceable first and second filters and adapted to move back and forth inside a respective one of the first and second bores; said first cartridge having a tap for diverting extrudate from the inlet to the outlet bore and being movable between (1) a start-up position in which extrudate flow to the first filter is blocked and in which the tap communicates with the inlet via said first flow passage to receive the extrudate and directs it to the outlet bore, (2) a running position in which the extrudate can pass from inlet to outlet via said first flow passage and through the first filter and (3) a blocking position in which extrudate flow to both the tap and the first filter is blocked and flow through the first flow passage is blocked; said second cartridge being movable between (1) a running position in which extrudate can pass from inlet to outlet via said second flow passage and through the second filter and (2) a blocking position in which extrudate flow to the second filter is blocked and flow through the second flow passage is blocked; wherein said first filter may be replaced when said first cartridge is in said blocking position and wherein said second filter may be replaced when said second cartridge is in said blocking position.

2. The cassette defined in claim 1, wherein said first and second bores extend horizontally through said housing, with said second bore arranged above said first bore and wherein said first and second cartridges are arranged horizontally in said first and second bores, respectively, with said first cartridge having the tap arranged below said second cartridge.

3. A filter-replacement device for an extruder, comprising (a) a housing having an inlet and an outlet for flowing plastic extrudate, first and second flow passages for the extrudate extending between said inlet and outlet, and first and second linear bores that extend through the first and second passages, respectively, at a right angle to the direction of flow of extrudate in said passages, and (b) first and second cartridges, respectively accommodating replaceable first and second filters, and adapted to move back and forth inside a respective one of the first and second bores; said first cartridge having an end with a start-up outlet bore therein and having a tap for diverting extrudate from the inlet to the outlet bore and being movable between (1) a start-up position in which extrudate flow to the first filter is blocked and in which the tap communicates with the inlet via said first flow passage to receive the extrudate and directs it to an exterior of the housing via the outlet bore, (2) a running position in which the extrudate can pass from inlet to outlet via said first flow passage and through the first filter and (3) a blocking position in which extrudate flow to both the tap and the first filter is blocked and flow through the first flow passage is blocked; said second cartridge being movable between (1) a running position in which extrudate can pass from inlet to outlet via said second flow passage and through the second filter and (2) a blocking position in which extrudate flow to the second filter is blocked and flow through the second flow passage is blocked; wherein said first filter may be replaced when said first cartridge is in said blocking position and wherein said second filter may be replaced when said second cartridge is in said blocking position.

4. The device defined in claim 3, wherein said first bore extends substantially vertically through said housing, wherein said first cartridge is arranged substantially vertically in said first bore with said end having said outlet bore disposed at a bottom of said first cartridge.

* * * * *